(12) United States Patent
Hall et al.

(10) Patent No.: US 6,714,779 B2
(45) Date of Patent: Mar. 30, 2004

(54) AUTOMATED TESTING FOR CELLULAR TELEPHONE SYSTEM INCLUDING EMERGENCY POSITIONING

(76) Inventors: Christopher J. Hall, 424 Bridgetown Ct., Satellite Beach, FL (US) 32937; Clay S. Turner, 130 Jade Cover Dr., Roswell, GA (US) 30075; Jimmy C. Ray, 3355 Juanita Dr., Denison, TX (US) 75020

( * ) Notice: Subject to any disclaimer, the term of this patent is extended or adjusted under 35 U.S.C. 154(b) by 0 days.

(21) Appl. No.: 10/151,521

(22) Filed: May 20, 2002

(65) Prior Publication Data

US 2002/0147007 A1 Oct. 10, 2002

Related U.S. Application Data

(62) Division of application No. 09/294,278, filed on Apr. 19, 1999, now Pat. No. 6,424,837.

(51) Int. Cl.[7] ................................................ H04Q 7/20
(52) U.S. Cl. ................... 455/423; 455/424; 455/67.11; 455/67.14; 455/266.1; 455/226.2; 455/404.2; 455/456.2
(58) Field of Search ..................... 455/423, 67.1, 455/456, 226.1, 560, 62.4, 404, 436, 439, 437, 424, 67.14, 456.2, 226.2, 404.2, 405

(56) References Cited

U.S. PATENT DOCUMENTS

| | | | |
|---|---|---|---|
| 5,095,500 A | * | 3/1992 | Tayloe et al. ............ 379/32.01 |
| 5,327,144 A | * | 7/1994 | Stilp et al. ................... 342/387 |
| 5,425,076 A | * | 6/1995 | Knippelmier ............ 379/27.04 |
| 5,613,217 A | * | 3/1997 | Hagstrom et al. ......... 455/67.1 |
| 5,873,040 A | * | 2/1999 | Dunn et al. .................. 455/456 |
| 5,970,413 A | * | 10/1999 | Gilhousen ................... 455/456 |
| 6,047,192 A | * | 4/2000 | Maloney et al. ............ 455/456 |

* cited by examiner

Primary Examiner—Vivian Chin
Assistant Examiner—Marceau Milord
(74) Attorney, Agent, or Firm—John L. DeAngelis, Jr.; Beusse Brownlee Wolter Mora & Maire, P.A.

(57) ABSTRACT

A method for automatically testing cellular telephone equipment includes a method for determining a geographic location of a mobile unit. The system includes monitoring sites located, e.g., at high elevations, so that each monitoring site electronically covers a geographical area including several cellular telephone base stations. Locations of mobile cellular stations, especially of such stations placing emergency 911 calls, are determined by comparing signal time-of-reception and other observable signal parameters at a combination of three cell sites and/or monitoring sites. Testing functions include transmitting gradually increasing power levels on a frequency assigned to a particular base station to determine the power level required to acquire service from that base station. Periodic repetitions are monitored over time to indicate any changes or degradation in performance. A scanner scans a designated group of control-channel frequencies, selecting active channels for measurement of transmission parameters and detection of anomalous transmission characteristics on any particular channel.

4 Claims, 3 Drawing Sheets

US 6,714,779 B2

AUTOMATED TESTING FOR CELLULAR TELEPHONE SYSTEM INCLUDING EMERGENCY POSITIONING

CROSS REFERENCE TO RELATED APPLICATIONS

This application is a Divisional of 09/294,278 filed on Apr. 19, 1999, now U.S. Pat. No. 6,424,837.

BACKGROUND OF THE INVENTION

1. Field of the Invention

This invention relates to methods and apparatus for determining a geographic position of a mobile telephone station, in combination with automated testing of cellular telephone equipment; and in particular to such methods and apparatus including elevated monitoring sites for active and passive testing of cellular base stations and mobile stations.

2. Description of the Related Art

Self-testing capabilities of cellular telephone sites currently includes test functions such as monitoring antenna performance by measuring the voltage standing wave ratio (VSWR), and monitoring site controller malfunctions and environmental conditions such as air conditioning and power failures. Generally, self-testing of electronic equipment detects relatively major malfunctions such as failures of individual radios or entire cell sites.

Currently, self-testing does not include remote monitoring of transmitted power levels to ensure that the entire signal path through the antenna is working properly and that the antenna is efficiently radiating the power delivered to it. Use of test mobiles at a site is known, but these are used to detect major failures, i.e., a problem is detected if the test mobiles do not respond when called. What is needed is an automated system which tests a complete end-to-end signal path, and which tests all the channels (frequencies, time slots, or PN codes) assigned to a particular cell site so that the entire system, including audio paths, is tested. Such a test system would not only detect equipment failures, but also detect more subtle changes in timing parameters, operational parameters, and system settings.

Such a testing system, properly designed, can also determine the location of cellular mobile stations in emergency situations. The familiar "911" is widely used as an emergency telephone number; 911 requests are relayed to the proper emergency-services department for response. The effectiveness of emergency services depends, of course, on emergency personnel being able to get to the caller without undue delay. To this end, the U.S. government has recently promulgated regulations requiring that providers of cellular telephone service be able to supply information on the position of a mobile station making an emergency call.

A problem with responding to requests for emergency assistance is that persons using mobile telephones often are unable to give their exact location when making an emergency call. A caller who happens to be in unfamiliar terrain does not know local landmarks, and may not know the name of the street or road on which he is driving. This lack of information regarding the caller's location hampers and delays efforts to get emergency assistance to the caller, whether the request is for medical assistance, the police, or roadside repairs.

The geographic size and shape of each cell in a cellular telephone network is largely determined by the coverage of transmit/receive antennas located at the central cell site, and by the surrounding terrain. In open country, cells are substantially circular, with overlapping borders. Where buildings or uneven topography block radio-frequency transmissions, the cells may be quite irregular in shape.

A mobile telephone station is handed off from cell to cell based on the received signal strength and signal quality at each cell site, with the call being routed through the cell receiving or providing the best signal. In a metropolitan area, a number of cells may be capable of receiving a 911 emergency call from a particular mobile station. Triangulation, using the signal time-of-arrival at three or more sites, angle of arrival, or some combination of observable signal parameters, may be used to determine the position of such a caller. In rural areas, however, cell sites are generally too widely spaced for triangulation to be possible. This gives rise to situations in which a caller makes an emergency 911 call, is asked his location by the dispatcher, and is unable to give accurate information. Emergency services are thus delayed, sometimes with serious consequences. What is needed, therefore is a system combining automated testing functions with the ability to determine a geographic position of a mobile station.

SUMMARY OF THE INVENTION

Parameters of cellular system performance, both base stations and mobile stations, are measured at automated monitoring sites. At least some of the monitoring sites are located at high-elevation sites to give a large-radius radio horizon, and/or at existing cell sites. A microprocessor, under either local or remote control, is placed at each monitoring site. The microprocessor controls a number of "test mobiles;" the test mobiles are interconnected to transmit/receive antennas. Power output of the test mobiles can be varied by the control microprocessor; the test mobiles are also capable of transmitting without the usual call set-up process, "creatively" violating their usual protocol in order to test system functions.

By slowly increasing or decreasing transmitted power on a particular frequency, the monitoring site can periodically test the power level required to acquire service on each channel served by a cell site, and the power setpoints or "dynamic power control" properties the site exhibits. Hand-off performance between cells is tested by increasing power on one test mobile and decreasing it on another at a different location, and recording the levels at which the hand-off occurs. Advanced protocols such as IS-136 and IS-95 require the test mobile to manipulate its reporting of signal parameters received from a serving site, but handoff testing may be accomplished in a conceptually similar way.

Recording time-of-arrival at several monitoring locations of a signal from a mobile station making an emergency 911 call provides data for determining a position solution for the mobile station. The present invention determines TDOA (time difference of arrival) by separating a received signal into its component frequencies, and plotting phase differences for individual frequencies at different receiving sites, either cell sites or monitoring sites. A slope of the phase-shift plot is proportional to the TDOA at different sites. The arrival times thus determined are used to plot a geographic location of the mobile station generating the call.

Data processing for the positioning functioning is done by a central E-911 computer, which may also be linked to the mobile telephone switching office (MTSO) computer. Occasionally data will be available from only the serving cell site and one other site, in which case the mobile's position can be narrowed to two possible choices. Comparison of the two locations to a map showing locations of roads, etc., can often eliminate one of the positions. Data from a combination of three sites, either cell sites or monitoring-only sites, using a time-of-arrival algorithm, will give a specific geographic location of the mobile station.

The same transmitter-locating technology may also be used for "value-added" services such as fleet vehicle tracking, non-emergency motorist assistance, etc., limited only by the imaginations of service providers. Thus for the purposes of this application, "911 calls" may include non-emergency calls or mobile registration actions which also are used to generate location fixes.

Based on the above, it is an object of this invention to provide a method by which operational parameters of cellular telephone sites may be monitored on an ongoing basis.

Another object is to provide a combination of a testing and monitoring system which further uses time data and/or other observable signal parameters collected by a monitoring site and by cellular base stations to automatically provide an accurate geographic location of a mobile station placing an emergency 911 call, or to monitor location of certain mobile stations on a continuing basis, utilizing routine transmissions including registration and/or non-emergency transmissions.

A further object of the invention is to provide such a method which is automated, and which periodically tests the complete signal path or channel for each cellular frequency served by a particular site.

Another object is to provide a method by which several cellular sites may be monitored and tested by a single monitoring site located at a high elevation.

The specific nature of the invention, as well as other objects, uses, and advantages thereof, will clearly appear from the following description and from the accompanying drawings, the different views of which are not necessarily scale drawings.

DESCRIPTION OF THE PREFERRED EMBODIMENTS

Figure 1:
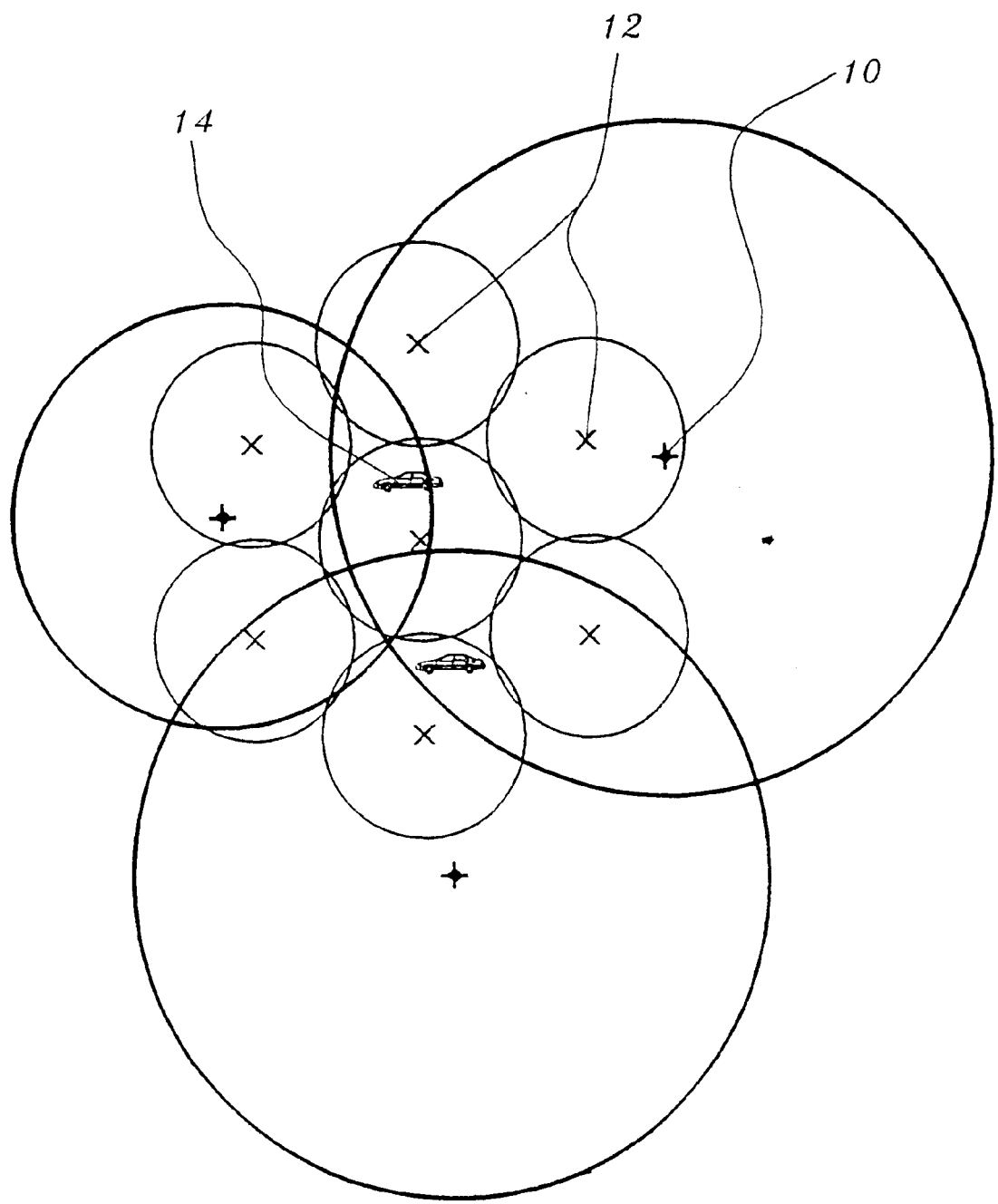
FIG. 1 is a schematic of a geographical area including three monitoring sites and their respective radio horizons, within which are included several cellular base stations and a variable number of cellular mobile stations.

Referring now to the drawings, FIG. 1 shows a map view of a geographical area including three remote cellular monitoring sites 10. As shown in the drawing, the radio horizons of the monitoring sites are much larger than the radio horizons of the cellular base stations 12. Located on tall towers or other suitably elevated locations such as mountains, tall buildings, etc., the monitoring sites are placed to receive RF transmissions from a number of base stations. Cellular telephone base stations are commonly referred to as "cell sites." The monitoring sites also receive transmissions from cellular telephone mobile stations 14 within their radio horizon. A mobile station 14 is defined as a cellular telephone station, either mobile, portable, or hand-held, used by a person on foot or in any type of vehicle, including ground vehicles, boats and other marine vessels, and aircraft. "Cellular telephone system," as used herein, is defined as including PCS systems; although PCS frequencies are generally different from cellular frequencies, some PCS and cellular telephone systems are transparent to one another.

The monitoring sites 10 may be thought of as data collection centers; they operate both in an active mode and in a passive mode, collecting a variety of data regarding cell site performance, and also data which is used to determine position solutions for particular mobile stations.

Figure 2:
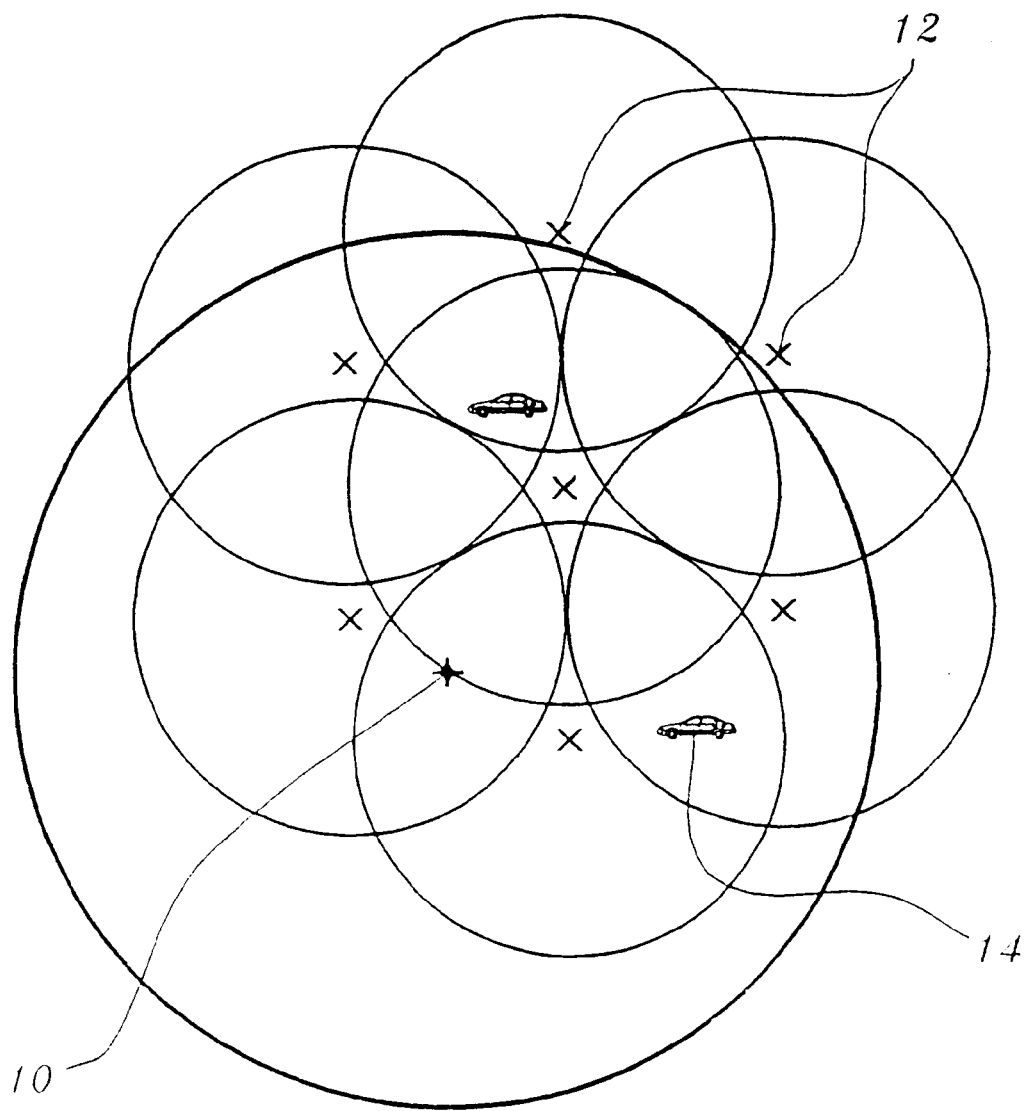
FIG. 2 is a schematic view of mobile telephone stations within an urban area, in which cell sites are placed more closely together.

Referring to FIG. 2, a mobile station 14 placing a call usually is within range of several cell sites 12 in an urban area. This is frequently true in urban areas, but in rural areas (FIG. 3) a signal from a mobile station will be received at fewer cell sites, perhaps only one. A call from a mobile station is carried by a particular cell site based on the received signal strength at/from the various cell sites receiving the signal (or on other signal quality measures, depending upon the protocol used); the call will be routed through the site(s) receiving the strongest or best quality signal. Of course, changes in the mobile station's position will cause the mobile station's signal level and signal quality to change at the various cell sites within range. When the signal level at (or from) another cell site becomes stronger or of better quality than that at the original cell site, the routing of the call is switched or "handed off" to the site receiving or providing the stronger or higher-quality signal. Such a hand-off is automatic and so brief that a caller is usually unaware when it happens. The preceding description applies to cellular systems in general, whether the mobile units are in use by pedestrians, or aboard ground vehicles, watercraft, or aircraft.

One function of the automated testing system is to measure the signal level required to acquire service from a particular cell site 12. To perform this test a monitoring site 10 goes "active," transmitting on a cellular channel control channel assigned to a cell site 12 within range of the monitoring site. The power level of the transmitted signal is initially low enough that it is near or below the noise threshold of the cell site equipment, and thus is not recognized by the cell site. As the power level is gradually increased, the signal reaches a level which is detected by the cell site under test, which then begins the process of establishing the call. The power level required to acquire service is recorded; the test is repeated periodically, so that comparison of test data indicates any change, trend, or degradation in equipment performance. Also, of course, major failures such as a lack of response by the cell site on one or more channels are immediately obvious.

Another function of the system is to test operation of hand-offs between cell sites. A monitoring site can be instructed to establish a call through a particular cell site. With the call established, the transmit power level from one monitoring site is decreased while the transmit power level is increased at the other monitoring site. In advanced protocols, the monitoring sites may also provide increasingly biased or offset measures of signal quality. The effect is the same as though a mobile station were traveling through the cellular network, with its RF link to one cell site weakening while growing stronger and of better quality to the other. When the system performs a hand-off, the time of hand-off is recorded along with the power levels (and applicable signal quality reports) being transmitted to each cell site. The system methodically tests channels in use at each cell site, and may perform several back-and-forth handoffs during each channel test. Such testing initially establishes a baseline of data for comparison to future tests;

as described above, comparison of periodic hand-off tests will indicate any changes in cell-site performance parameters. By handing the call back and forth between the cell sites, any bias in the hand-off procedure can be detected and measured, as well as the speed of response by each cell site.

In a passive mode, a monitoring unit at a cell site 12 scans cellular frequencies and/or logical "channels", looking for activity. A receiver is programmed to detect cellular channels for cell sites within the monitoring site's range; the receiver may be part of, or integrated into, the test mobiles in the monitoring unit. Adjacent or nearby cells may not use the same cellular channels because such use would cause interference. Many cell sites may be assigned the same cellular channels, but those using the same channels must not be close enough to cause interference with each other's calls. When the test system detects a received signal on a particular channel, the computer controller determines whether a call is in progress on that forward channel locally. Lack of a local call indicates that some nearby cell is using that channel, increasing chances for interference. Data collected in the mode just described is recorded for analysis.

Another function of the system is analysis of data to determine the location of a mobile station. FIG. 2 illustrates mobile telephone units placing 911 calls within the cellular telephone system of an urban area. Given the density of cell sites, such a call is often received at several cell sites; a known relative-time-of-signal-arrival procedure will be used to time-stamp the call. The same procedure is used to collect time information from other cell sites which receive the call. Using the relative time-of-arrival information, a triangulation algorithm is used to determine a position of the mobile station from which the call is placed. In some regions shown in FIG. 2, monitoring sites not colocated with cell sites provide additional time-of-arrival data points necessary to provide a unique position solution or to enhance accuracy.

Figure 3:
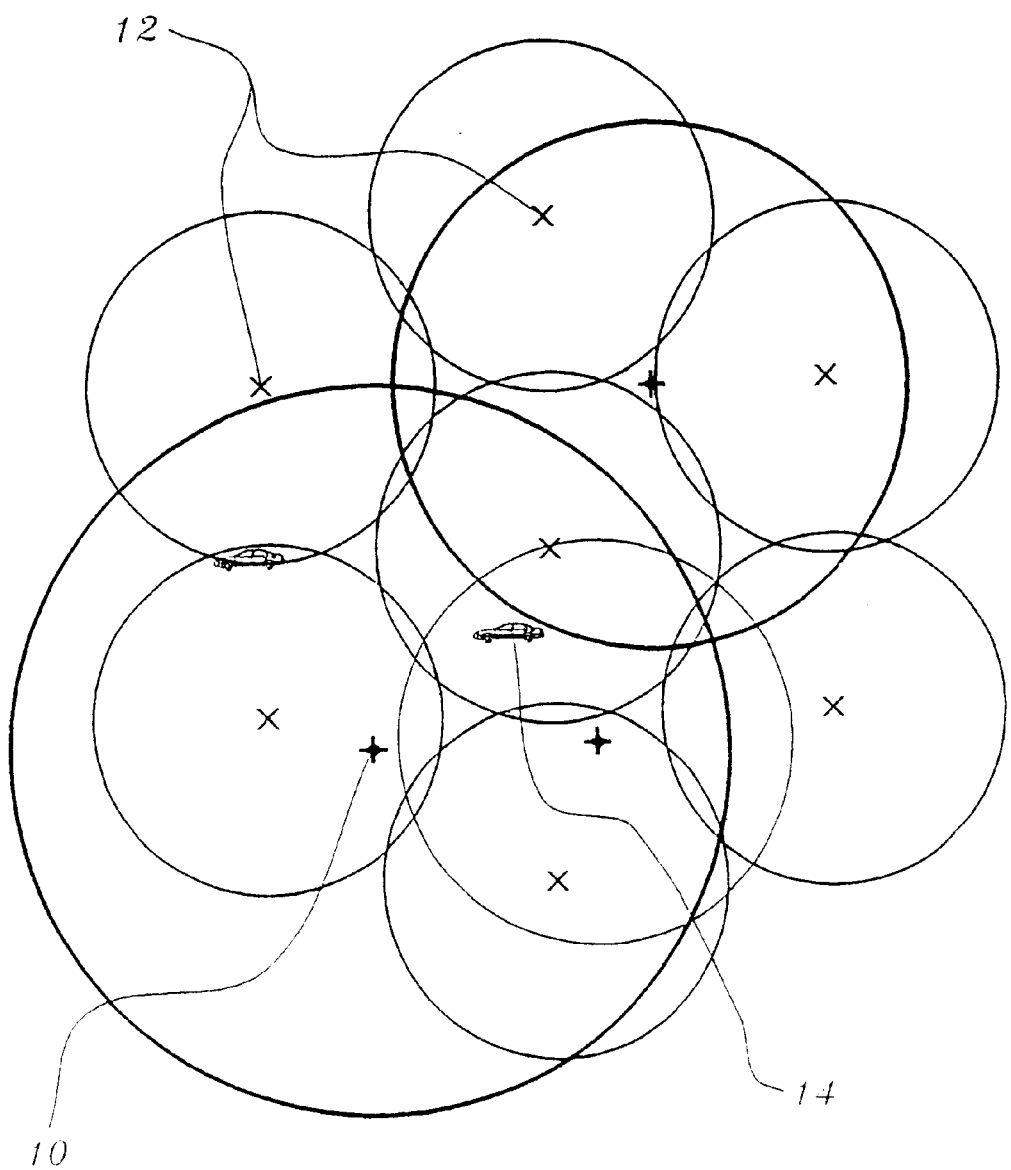
FIG. 3 is a schematic view of mobile stations in a rural area, in which cell sites are placed as far apart as practicable, and some cell site coverage gaps exist.

FIG. 3 is a schematic of a mobile telephone unit in a rural area. Wider spacing of cell sites precludes triangulation by signal time-of-arrival as described above without the use on non-colocated monitoring sites 10, because the call is not received at a sufficient number of cell sites. According to the invention, however, the call will be received at one or more monitoring sites 10 in addition to one or more cell sites 12. In some regions of FIG. 3, these monitoring sites provide the majority of the data points needed for a unique position determination. Each monitor site is configured to monitor control channels accessible by a mobile unit within the radio horizon of the monitor site. Time utilization of reverse control channels is statistically low, therefore position determination (time of arrival) data may be received by monitoring stations 10 even where the monitoring station 10 receives signals from regions containing more than one cell site 12 reusing the same control channel(s). Because the cellular telephone system in the United States is structured so that each area is served by two cellular service providers and possibly several PCS providers, the available control channels may include those of more than one provider, with potential sharing of monitoring resources.

To locate the position of a mobile station, call access attempts are monitored. A "call access attempt" by a mobile station, as used herein, includes a call origination, a response to a call, or a registration. Detection of preselected dialled numbers such as the emergency 911 number, or preselected user identity numbers prompt the monitor controller to mark the arrival time of the signal, the ESN/MIN (Electronic Serial Number/Mobile Identification Number) of the calling unit, and the channel on which the call is received. Other information recorded includes the DCC or other parameters which identify the site being accessed, and observable parameters such as angle of arrival. The monitor controller then contacts a central computer, an E-911 computer designated to receive location information; this contact may be a dial-up call (either land-line or cellular), a "connectionless" network link, or via a dedicated circuit. With the contact established, the ESN/MIN, time information, and observable signal parameters will be downloaded to the E-911 computer. The information thus transmitted is combined, by the E-911 computer, with the similar information received by the serving cell site and/or other monitoring sites.

Using a time-difference-of-arrival algorithm, the E-911 computer determines a geographic location of the mobile station from which the call was placed. In an alternate embodiment, the information processing to determine a geographic location is performed by the computer controller for the cellular telephone system; that is, the "E-911 computer" is but a software package in another computer.

The present invention uses a frequency domain approach to determine the signal time of arrival at various monitoring sites. This differs from the traditional time domain method, which involves performing a cross correlation on signals received a two or more sites. Correlation is done directly by the correlation integral, or by the Fourier transform method. (In the "Fourier Transform Method:, the two time domain functions are transformed to the frequency domain, then multiplied (Hermetian product) together, and the product is inverse transformed.) In either case (they are mathematically equivalent), a cross correlation function is generated; the position of the peak or maximum of the cross correlation function is related to the time shift between the two functions.

In this invention a frequency domain approach is used, in which the received signals from two different locations are decomposed into their constituent frequencies. The phase functions for the two signals are found. The difference in these phase functions, when expressed as a function of frequency, will ideally be a linear equation whose slope is directly proportional to the time difference of arrival. Likewise the "y" intercept will be the relative frequency error between the two signals. Since there will likely be noise present, a linear regression may be performed to find the slope and intercept. Alternatively, a derivative of the phase function may be found. Ideally, it will have a constant valued function of frequency that may be smoothed by filtering. This phase derivative approach offers an advantage of avoiding the discontinuities that accompany the phase unwrapping associated with finding the phase function.

Advantages of the frequency approach just described include: 1) avoiding the computation of the cross correlation function and the subsequent peak search; 2) allowing direct frequency domain filtering to optimize signal-to-noise ratio, i.e., the signal power as a function of frequency may be used to weigh the filtering; 3) a direct yield of the TDOA; 4) utilization of the efficient fast Fourier transform; and 5) using an easy way to avoid the phase unwrapping problem associated with finding phase shifts.

It is understood that unique determination of a mobile station's geographic location requires data from three or more sites. In a rural area, data may be available only from a monitoring site and one base station. Most location algorithms, given data from two sites, will provide two possible locations for the mobile station placing the call. In most cases, however, these possible locations can be narrowed to one when the location data is superimposed on a map. If one location coincides with a road or a populated area while the other does not, the former is the most likely location of the mobile station.

The restrictive description and drawings of the specific examples above do not point out what an infringement of this patent would be, but are to enable one skilled in the art to make and use the invention. Various modifications can be made in the construction, material, arrangement, and operation, and still be within the scope of our invention. The limits of the invention and the bounds of the patent protection are measured by and defined in the following claims.

We claim as our invention:

1. A method for automatically testing to monitor performance of cellular telephone equipment by a combination of passive signal monitoring and active signal testing, comprising the following steps:

locating a plurality of cellular facilities for transmitting signals to and/or receiving signals from a mobile telephone station, wherein a portion of the radio coverage area of at least one of said plurality of cellular facilities overlaps a portion of the radio coverage area of at least one other of said plurality of cellular facilities, and wherein the plurality of cellular facilities are selected from among a cellular base station and a fixed active monitoring station having a radio coverage area comprising a plurality of cellular base station coverage areas or portions thereof, accessing a cellular facility via an RF link, testing, via one or more cellular facilities, operational parameters of transmissions from cellular mobile stations and cellular base stations, controlling said testing with a test and measurement control computer, and reporting from said cellular facilities variations in said signal quality parameters outside predetermined limits.

2. The method as described in claim 1, wherein said cellular facility includes on-site test equipment at a cellular telephone base station.

3. The method of claim 1 further comprising:

transmitting a signal from an active monitoring station to a cellular base station having an overlapping base station coverage area, wherein the signal causes the active monitoring station to acquire service with the cellular base station, modifying the power level of the signal, and determining the power level at which service is acquired.

4. The method of claim 1 further comprising:

transmitting a signal from a first and a second monitoring station to a cellular base station having an overlapping radio coverage area with both the first and the second monitoring stations, decreasing the signal level of the signal transmitted from the first monitoring station, increasing the signal level of the signal transmitted from the second monitoring station, determining the signal level of both the first and the second signals that would cause a call to be switched from the first monitoring station to the second monitoring station.

* * * * *